March 8, 1949. L. L. HORRELL 2,463,538
ROTATABLE MAGNET DEVICE
Filed March 15, 1948
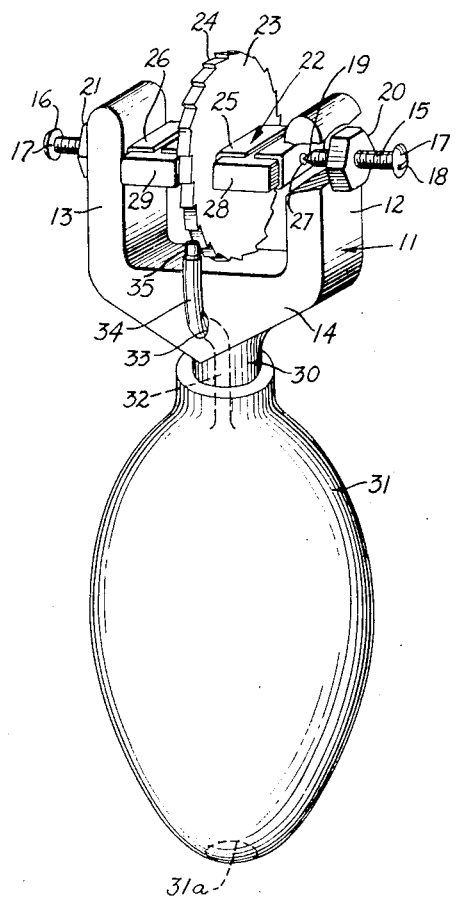
INVENTOR.
LLOYD L. HORRELL
BY
ATTORNEY Patented Mar. 8, 1949

2,463,538

UNITED STATES PATENT OFFICE 2,463,538

ROTATABLE MAGNET DEVICE

Lloyd L. Horrell, Poquonnock Bridge, Conn.

Application March 15, 1948, Serial No. 15,037

6 Claims. (Cl. 171—76)

(Granted under the act of March 3, 1883, as amended April 30, 1928; 370 O. G. 757)

The present invention concerns a device for generating a rotating magnetic field and in particular concerns a portable, manually operable device having a magnet adapted for rotation by an air turbine.

In the art of magnetostrictive transducers it is necessary both in making an original installation and in maintenance operations during normal use to test electrical connections in continuity and to insure that proper terminals are connected with each other. For example, in the use of magnetostrictive hydrophones installed in submarines it is necessary to make frequent electrical tests to determine whether or not the hydrophones are functioning properly. The magnetostrictive hydrophone equipment aboard submarines is installed in locations of limited accessibility so that it is difficult in making tests of the equipment for an operator to gain access thereto and it is impossible to use bulky and elaborate equipment of conventional construction.

Conventional testing devices used heretofore are unsatisfactory in several respects. One disadvantage resides in the fact that such devices require electrical connections between the testing device and the installation to be tested. Another disadvantage resides in the fact that such devices are of bulky construction and therefore not suitable for use in locations of limited accessibility such as the locations of magnetostrictive hydrophones aboard submarines. Such devices also are unsatisfactory due to the complexity of their construction and use.

The rotatable magnet device of this invention overcomes these objections. The device does not require electrical connections with the installation to be tested and is rendered operative for test purposes merely by being brought into close proximity with the installation to be tested. The device is of portable construction adapted for manual operation and has small dimensions so that it is suitable for use in places of limited accessibility. The construction and operation of the device are simple.

The device essentially comprises a yoke, a magnet mounted for rotation relative to the yoke, an air-turbine wheel for rotation with the magnet, a nozzle to deliver an air jet to the air-turbine wheel, and a manually operable bulb for pumping air through the nozzle. Squeezing of the bulb causes an air jet from the nozzle to impinge on the turbine wheel for effecting rotation of the wheel and magnet thus providing a rotating magnetic field. When the device is positioned in close proximity to a conductor of the installation to be tested, an electromotive force is induced in the conductor.

An object of the invention is to provide a device for producing a rotating magnetic field.

Another object is to provide a device for producing a rotating magnetic field, the device being of such construction as to be suitable for use in testing magnetostrictive installations.

Another object is to provide a device for producing a rotating magnetic field, the device being of such construction as to be suitable for use without requiring electrical connections with the installations to be tested.

Another object is to provide a device for producing a rotating magnetic field, the device being of such construction as to be suitable for use in places of limited accessibility.

Another object is to provide a device for producing a rotating magnetic field, the device being of simple construction.

Another object is to provide a magnetic device that essentially comprises a body, a magnet rotatably mounted on the body, an air-turbine wheel fixedly mounted relative to the magnet, a nozzle adjacent the wheel, and a manually operable pump for pumping fluid through the nozzle.

Another object is to provide a portable, manually operable device for generating a rotating magnetic field comprising a yoke, a magnet rotatably mounted on the yoke, an air-turbine wheel fixedly mounted relative to the magnet, a nozzle adjacent the wheel for projecting an air jet against the wheel, and a manually compressible rubber bulb mounted on the yoke communicating with the nozzle for pumping air through the nozzle.

Further objects and advantages of this invention, as well as its construction, arrangement and operation will be apparent from the following description and claims, in which, The single figure is an isometric view broken away in part illustrating a preferred embodiment of the invention.

The device comprises a yoke 11 having spaced parallel arms 12 and 13 joined together by a crosshead 14. Disposed in alignment and threaded through arms 12 and 13 are a pair of screws 15 and 16, respectively, each of the screws being provided with a head 17 having a kerf 18. Screws 15 and 16 are disposed externally of yoke 11 and each of the screws terminates in the space between arms 12 and 13 in a bearing pintle 19. Screws 15 and 16 are adjustable toward and away from each other by screwing with respect to their supporting arms 12 and 13, respectively. Locknuts 20 and 21 are provided for locking the screws in adjusted position.

Disposed between arms 12 and 13 for rotation about the axis of alignment of screws 15 and 16 is a rotor 22. Rotor 22 includes a turbine wheel 23 disposed centrally between arms 12 and 13 and having a plurality of vanes 24 formed about its periphery. Fixedly mounted on opposite sides of turbine wheel 23 are magnet supports 25 and 26 each provided with a bearing surface 27 adapted for contact with bearing pintles 19. Fixedly disposed within supports 25 and 26 are permanent magnets 28 and 29, respectively.

Mounted on a neck 30 of yoke 11 is a rubber bulb 31 having a conventional intake valve 31a. The interior of bulb 31 is connected by passage 32 through yoke neck 30 and yoke crosshead 14 to an outlet port 33. A nozzle 34 mounted on yoke crosspiece 14 is connected at one end with outlet port 33 and at the other end is provided with a jet tip 35 disposed adjacent vanes 24 on turbine wheel 23.

In operation bulb 31 is manually squeezed by an operator and this compresses air within the bulb and pumps the air through passage 32, outlet port 33, nozzle 34 and jet tip 35 to provide a jet of air that impinges against vanes 24 of turbine wheel 23 to cause rotation of turbine wheel 23. Since turbine wheel 23 is fixedly mounted with respect to magnet supports 25 and 26 and with respect to magnets 28 and 29, rotation of turbine wheel 23 causes rotation of magnets 28 and 29 about the axis established by bearing pintles 19 and bearing surfaces 27. Rotation of magnets 28 and 29 produces a rotating magnetic field that can be used in testing electrical installations such as magnetostrictive transducers.

In testing electrical installations an operator positions the device with rotor 22 in close proximity to a conductor of the installation to be tested so that squeezing of bulb 31 and rotation of magnets 28 and 29 produces a rotating magnetic field which by induction imposes an electromotive force upon the conductor. Since the linkage between the testing device and the installation to be tested is a magnetic linkage only, there is no need for electrical connections and for electrical conductors between the testing device and the installation to be tested. Magnitude of the imposed electromotive force can be regulated by controlling the speed of rotation of rotor 22 and this is effected by controlling the squeezing of bulb 31.

The device is of relatively small construction and can be of an overall length from the tip of bulb 31 to the remote extremity of turbine wheel 23 of the order of 5 inches or less. This small size has the advantage of rendering the device readily portable and it also renders the device suitable for use in places of limited accessibility such as are encountered in connection with magnetostrictive hydrophone installations aboard submarines.

It is understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A magnetic device comprising a body, a magnet mounted for rotation relative to said body, a turbine wheel fixedly mounted relative to said magnet for rotation with said magnet, a nozzle adjacent said wheel for projecting a fluid jet against said wheel, and a manually operable pump for pumping fluid through said nozzle.

2. A portable, manually operable device for generating a rotating magnetic field, said device comprising a body, a magnet mounted for rotation relative to said body, a turbine wheel fixedly mounted relative to said magnet for rotation with said magnet, a nozzle adjacent said wheel for projecting a gas jet against said wheel, and a manually compressible bulb connected with said nozzle for pumping gas through said nozzle.

3. A portable, manually operable device for generating a rotating magnetic field, said device comprising a yoke, a magnet mounted for rotation relative to said yoke, an air-turbine wheel fixedly mounted relative to said magnet for rotation with said magnet, a nozzle adjacent said wheel for projecting an air jet against said wheel, and a rubber bulb mounted on said yoke and communicating with said nozzle for pumping air through said nozzle.

4. A portable, manually operable device for generating a rotating magnetic field, said device comprising a yoke having a pair of spaced arms and a crosshead; a rotor supported for rotation between said arms; a pair of aligned bearings for supporting said rotor for rotation relative to said arms, said rotor having a turbine wheel and a magnet fixedly mounted relative to each other, said wheel at the periphery thereof being provided with radial vanes; an air pump having a manually compressible bulb for compressing air and mounted on said yoke, said yoke being formed with an outlet port and an air passage connecting the interior of said bulb with the outlet port, and a nozzle on said yoke connected at one end to the outlet port and at the other end having a jet tip adjacent the wheel vanes and adapted to project a jet of air against said vanes to actuate said rotor.

5. A portable, manually operable device for generating a rotating magnetic field, said device comprising a non-magnetic yoke having a pair of parallel, spaced arms and a crosshead connecting said arms; a pair of aligned screws one extending through each of said arms, said screws terminating in the space between said arms, and a pair of bearings one at the terminus of each screw between said arms; a rotor supported for rotation on said bearings, said rotor having a turbine wheel provided with radial, peripheral vanes, said rotor being mounted centrally with respect to the rotor axis between said yoke arms, a pair of supports fixedly mounted relative to said wheel and one on each side of said wheel at the rotor axis, and a pair of permanent magnets one in each of said supports; an air pump having a manually compressible rubber bulb for compressing air and mounted on said yoke, said yoke being formed with an outlet port and an air passage connecting the interior of the bulb with the outlet port; and a nozzle on said yoke connected at one end to the outlet port and at the other end having a jet tip adjacent the wheel vanes and adapted to project a jet of air against said vanes to actuate said rotor.

6. A magnetic device comprising a body, a magnet mounted for rotation relative to said body, a turbine wheel fixedly mounted relative to said magnet for rotation with said magnet, a nozzle adjacent said wheel for projecting a fluid jet against said wheel, and a pump for pumping fluid through said nozzle.

LLOYD L. HORRELL.

No references cited.